US011145329B2

(12) United States Patent
Anno et al.

(10) Patent No.: US 11,145,329 B2
(45) Date of Patent: Oct. 12, 2021

(54) RECORDING MEDIUM CARTRIDGE AND DRIVE DEVICE

(71) Applicant: Sony Corporation, Tokyo (JP)

(72) Inventors: Kazuo Anno, Miyagi (JP); Eiji Nakashio, Miyagi (JP); Takanobu Iwama, Miyagi (JP); Naohiro Adachi, Tokyo (JP); Shinya Tochikubo, Miyagi (JP); Masayoshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/053,573

(22) PCT Filed: Mar. 8, 2019

(86) PCT No.: PCT/JP2019/009238
§ 371 (c)(1),
(2) Date: Nov. 6, 2020

(87) PCT Pub. No.: WO2019/216015
PCT Pub. Date: Nov. 14, 2019

(65) Prior Publication Data
US 2021/0241793 A1    Aug. 5, 2021

(30) Foreign Application Priority Data
May 9, 2018    (JP) .............................. JP2018-090482

(51) Int. Cl.
*G11B 23/02*    (2006.01)
*G06K 19/04*    (2006.01)
(Continued)

(52) U.S. Cl.
CPC ............ *G11B 5/78* (2013.01); *G11B 5/00813* (2013.01)

(58) Field of Classification Search
CPC ......... G11B 27/36; G11B 23/04; G11B 23/03; G11B 5/00; G11B 23/02; G11B 23/08;
(Continued)

(56) References Cited

U.S. PATENT DOCUMENTS 7,240,825 B2 *    7/2007    Tada ................... G11B 23/037
235/375
8,063,783 B2 *    11/2011    Miyashita .......... G06K 17/0025
340/572.1

(Continued)

FOREIGN PATENT DOCUMENTS

JP    2002-117644 A    4/2002
JP    2004-355702 A    12/2004
(Continued)

OTHER PUBLICATIONS

International Search Report dated Jun. 4, 2019 in connection with PCT/JP2019-009238.

*Primary Examiner* — Nabil Z Hindi
(74) *Attorney, Agent, or Firm* — K&L Gates LLP

(57) ABSTRACT

A recording medium cartridge according to an embodiment of the present technology includes: an information recording medium; a first cartridge memory; and a second cartridge memory. The first cartridge memory is capable of storing first information relating to the information recording medium, and includes a non-contact communication medium capable of reading/writing the first information via a first communication device disposed in a drive device. The second cartridge memory is capable of storing second information relating to the information recording medium, and is configured to be capable of reading the second information via a second communication device.

8 Claims, 6 Drawing Sheets

(51) Int. Cl.
*G11B 5/78* (2006.01)
*G11B 5/008* (2006.01)

(58) Field of Classification Search
CPC ............. G06K 19/045; G06K 19/0723; G08B 21/0275
USPC .................. 360/132, 133, 75; 340/571.1
See application file for complete search history.

(56) References Cited

U.S. PATENT DOCUMENTS

| | | | |
|---|---|---|---|
| 8,089,727 B2* | 1/2012 | Bates ................... | G11B 27/11 360/132 |
| 8,199,433 B2* | 6/2012 | Stiarwalt .............. | G11B 23/042 360/132 |

FOREIGN PATENT DOCUMENTS

| | | |
|---|---|---|
| JP | 2006-040435 A | 2/2006 |
| JP | 2007-242218 A | 9/2007 |
| JP | 2007-324638 A | 12/2007 |
| JP | 2009-211743 | 9/2009 |
| JP | 2011-170945 A | 9/2011 |

* cited by examiner

RECORDING MEDIUM CARTRIDGE AND DRIVE DEVICE

TECHNICAL FIELD

The present technology relates to a recording medium cartridge including a cartridge memory that stores management information of an information recording medium, and a drive device that drives the same.

BACKGROUND ART

In recent years, a magnetic recording medium has been widely used for backing up electronic data, and the like. As one magnetic recording medium, for example, a magnetic tape cartridge has a large capacity and can be preserved for a long time, and thus, the magnetic tape cartridge has attracted increasing attention as a storage medium for big data and the like.

For example, a magnetic tape cartridge of the LTO (Linear Tape Open) standard includes an RFID (Radio Frequency Identification) tag called a cartridge memory (see, for example, Patent Literature 1). Since the cartridge memory receives the signal magnetic field transmitted from a tape drive (reader/writer) to generate electric power, the cartridge memory is capable of communicating with the reader/writer without power supply. The cartridge memory includes an antenna and an IC chip for communication and recording, and is configured to be capable of reading and writing production management information of cartridges and magnetic tapes, usage history, summary of recorded content, and the like.

CITATION LIST

Patent Literature

[Patent Literature 1] Japanese Patent Application Laid-open No. 2009-211743

DISCLOSURE OF INVENTION

Technical Problem

The number of data tracks (track density) of this type of magnetic recording medium increases for each generation, and thus, the required capacity of the cartridge memory is also increasing. However, as the memory size of the cartridge memory increases, the power consumed by the cartridge memory also increases. Since this type of cartridge memory is required to operate at a constant magnetic field strength, there is a limitation on the electric power that can be extracted from an antenna. For this reason, there is a demand for a technology of increasing the memory size while ensuring stable communication with a reader/writer by driving a cartridge memory with electric power that can be extracted from an antenna.

In view of the circumstances as described above, it is an object of the present technology to provide a recording medium cartridge and a drive device that are capable of realizing an increased capacity of a cartridge memory while ensuring stable communication with a reader/writer.

Solution to Problem

A recording medium cartridge according to an embodiment of the present technology includes: an information recording medium; a first cartridge memory; and a second cartridge memory.

The first cartridge memory is capable of storing first information relating to the information recording medium, and includes a non-contact communication medium capable of reading/writing the first information via a first communication device disposed in a drive device.

The second cartridge memory is capable of storing second information relating to the information recording medium, and is configured to be capable of reading the second information via a second communication device.

In the recording medium cartridge, since the first cartridge memory and the second cartridge memory are provided, it is possible to increase the total capacity of the cartridge memory. In addition, since there is no need to increase the memory size of the first cartridge memory, stable communication between the first cartridge memory and the first communication device is ensured even under the limited magnetic field strength from a reader/writer. Further, since the second cartridge memory is configured to be capable of reading the information by the second communication device different from the first communication device, it is possible to read information relating to the tape cartridge without being loaded into a drive device.

The second cartridge memory may be configured to be capable of writing the second information via the drive device.

The second cartridge memory may have a memory capacity larger than a memory capacity of the first cartridge memory.

The first information may include management information of the information recording medium, and the second information may include image information relating to the information recording medium.

The second cartridge memory may be a non-contact communication medium.

The second cartridge memory may include an external connection terminal.

The information recording medium may be a magnetic recording medium.

The information recording medium may be a tape-shaped recording medium.

A drive device according to an embodiment of the present technology includes: a head unit; a first communication unit; and a second communication unit.

The head unit is configured to be capable of recording/reproducing data on/from an information recording medium housed in a recording medium cartridge.

The first communication unit is configured to be capable of communicating with a first cartridge memory housed in the recording medium cartridge and reading or writing first information relating to the information recording medium.

The second communication unit is configured to be capable of communicating with a second cartridge memory housed in the recording medium cartridge and reading or writing second information relating to the information recording medium.

Advantageous Effects of Invention

As described above, in accordance with the present technology, it is possible to realize an increased capacity of a cartridge memory while ensuring stable communication with a reader/writer.

Note that the effect described here is not necessarily limitative, and any of the effects described in the present disclosure may be provided.

MODE(S) FOR CARRYING OUT THE INVENTION

An embodiment according to the present technology will now be described below with reference to the drawings.

Figure 1:
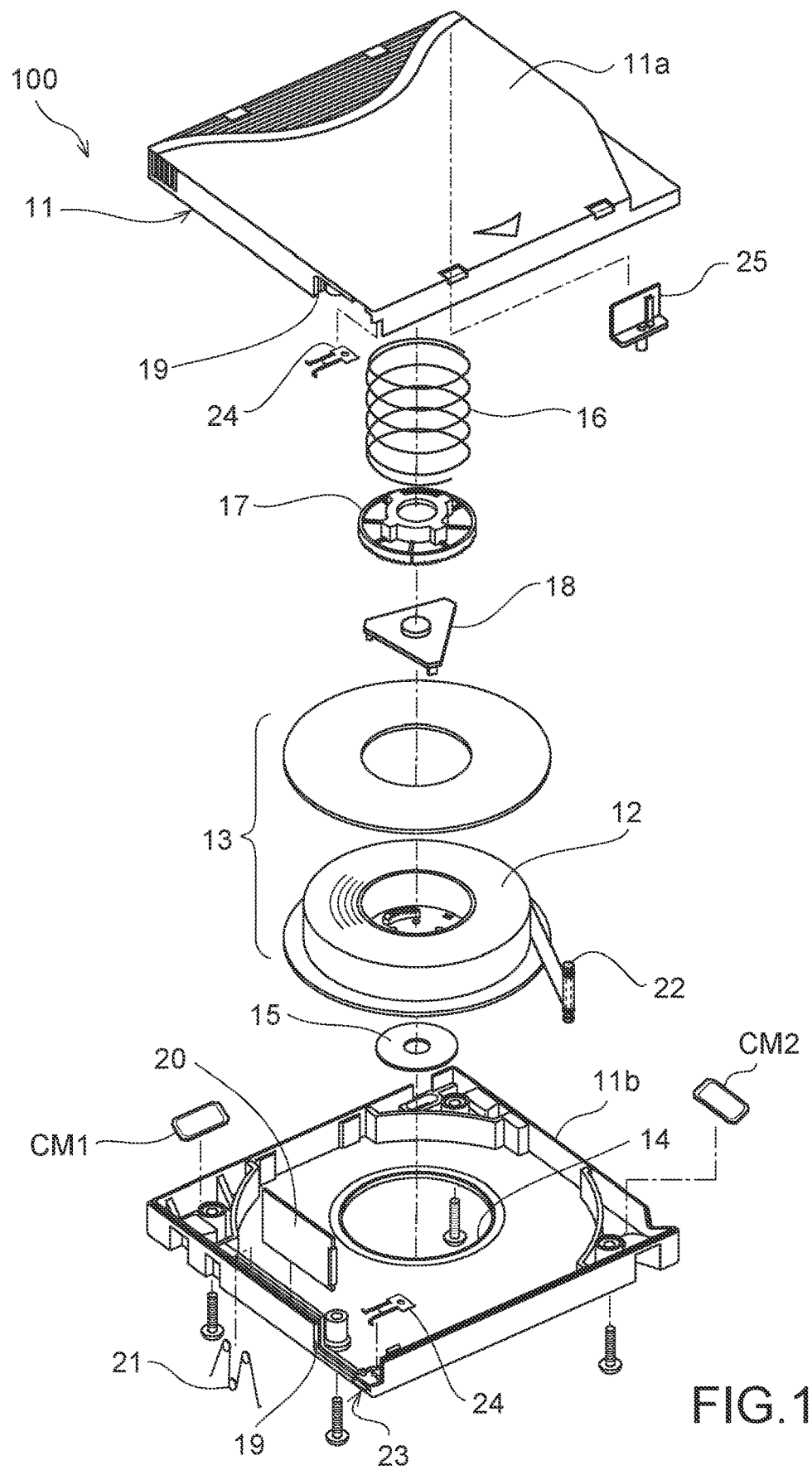
FIG. 1 is an exploded perspective view showing a recording medium cartridge according to an embodiment of the present technology.
Figure 2:
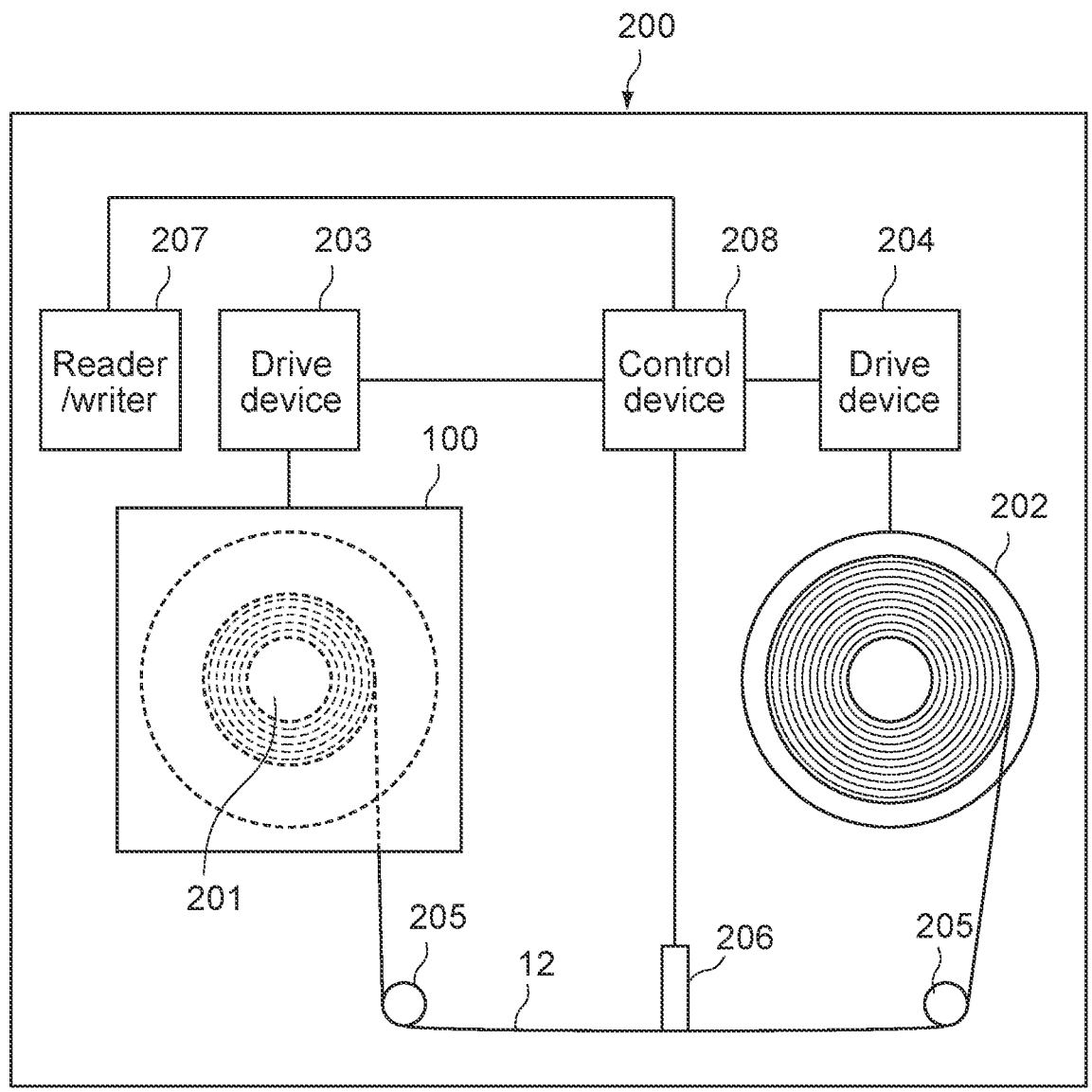
FIG. 2 is a schematic diagram showing a configuration example of a drive device applied to the recording medium cartridge.

FIG. 1 is an exploded perspective view showing a magnetic tape cartridge according to an embodiment of the present technology, and FIG. 2 is a schematic perspective view of a tape drive device. In this embodiment, a magnetic tape cartridge of the LTO standard shown in FIG. 1 (hereinafter, referred to as the tape cartridge 100) will be described as a recording medium cartridge. Hereinafter, the configuration of the tape cartridge 100 and a tape drive device 200 shown in FIG. 2 will be schematically described.

[Tape Cartridge]

As shown in FIG. 1, the tape cartridge 100 includes a cartridge case 11 formed by connecting an upper shell 11a and a lower shell 11b by a plurality of screw members. A single tape reel 13 on which a magnetic tape 12 (tape-shaped recording medium) as a magnetic recording medium is wound is rotatably housed inside the cartridge case 11. In this embodiment, a magnetic tape having the number of data tracks of, for example, 6,000 or more is used as the magnetic tape 12.

A chucking gear (illustration omitted) that engages with a spindle 201 (see FIG. 2) of the tape drive device 200 is formed in an annular shape at the bottom center of the tape reel 13, and the chucking gear is exposed to the outside through an opening 14 formed in the center of the lower shell 11b. An annular metal plate 15 magnetically attracted to the spindle 201 is fixed to the inner periphery side of the chucking gear.

A reel spring 16, a reel lock member 17, and a spider 18 are disposed between the inner surface of the upper shell 11a and the tape reel 13. They constitute a reel locking mechanism that prevents the tape reel 13 from rotating when the tape cartridge 100 is not in use.

A tape outlet 19 for drawing out one end of the magnetic tape 12 to the outside is provided in one side wall portion of the cartridge case 11. A slide door 20 for opening and closing the tape outlet 19 is disposed inside the side wall portion. The slide door 20 is configured to slide in a direction that opens the tape outlet 19 against the biasing force of a torsion spring 21 by engagement of the tape drive device 200 with a tape loading mechanism (not shown).

A leader pin 22 is fixed to one end portion of the magnetic tape 12. The leader pin 22 is configured to be attachable/detachable to/from a pin holding portion 23 provided on the inner side of the tape outlet 19. The pin holding portion 23 includes an elastic holder 24 for elastically holding the upper end portion and the lower end portion of the reader pin 22 between the upper wall inner surface of the cartridge case 11 (the inner surface of the upper shell 11a) and the bottom wall inner surface (the inner surface of the lower shell 11b), respectively.

Then, inside the other side wall of the cartridge case 21, in addition to a safety tab 25 for suppressing erroneous erasure of the information recorded on the magnetic tape 12, a first cartridge memory CM1 and the second cartridge memory CM2 which can read and write the content related to the information recorded in the magnetic tape 12 in a non-contact manner are disposed. In this embodiment, the first and second cartridge memories CM1 and CM2 each include a non-contact communication medium in which an antenna coil, an IC chip, and the like are mounted on a substrate.

[Tape Drive Device]

As shown in FIG. 2, the tape drive device 200 is configured to be capable of loading the tape cartridge 100. The tape drive device 200 is configured to be capable loading one tape cartridge 100, but may be configured to be capable of loading a plurality of tape cartridges 100 simultaneously.

The tape drive device 200 includes a spindle 201, a take-up reel 202, a spindle drive device 203, a reel drive device 204, a plurality of guide rollers 205, a head unit 206, a reader/writer 207 as a first communication device, a control device 208, and the like.

The spindle 201 includes a head portion that engages with the chucking gear of the tape reel 13 through the opening 14 formed in the lower shell 11b of the tape cartridge 100. The spindle 201 raises the tape reel 13 by a predetermined distance against the biasing force of the reel spring 16, releasing the reel lock function by the reel lock member 17. Thus, the tape reel 13 is rotatably supported inside the cartridge case 11 by the spindle 201. The spindle drive device 203 causes, in response to a command from the control device 208, the spindle 201 to rotate. The take-up reel 202 is configured to be capable of fixing the tip (leader pin 22) of the magnetic tape 12 drawn from the tape cartridge 100 via the tape loading mechanism (not shown). The plurality of guide rollers 205 guides the travelling of the magnetic tape 12 such that the tape path formed between the tape cartridge 100 and the take-up reel 202 is in a predetermined relative position relative to the head unit 206. The reel drive device 204 causes, in response to a command from the control device 208, the take-up reel 202 to rotate. When data signals are recorded/reproduced on/from the magnetic tape 12, the spindle 201 and the take-up reel 202 are caused to rotate by the spindle drive device 203 and the reel drive device 204 and thus, the magnetic tape 12 is caused to travel.

The head unit 206 is configured to be capable of recording data signals on the magnetic tape 12 or reproducing the data signals written to the magnetic tape 12 in response to a command from the control device 208.

The reader/writer 207 (first communication unit) is configured to be capable of reading predetermined management information from the first cartridge memory CM1 mounted on the tape cartridge 100 or recording predetermined management information on the first cartridge memory CM1 in response to a command from the control device 208. As the communication system between the reader/writer 207 and the first cartridge memory CM1, for example, an ISO14443 system is adopted.

The control device 208 includes, for example, a computer including a CPU (Central Processing Unit), a storage unit, a communication unit, and the like, and integrally controls the respective units of the tape drive device 200.

[Cartridge Memory]

Next, the first cartridge memory CM1 and the second cartridge memory CM2 will be described in detail.

(First Cartridge Memory)

Figure 3:
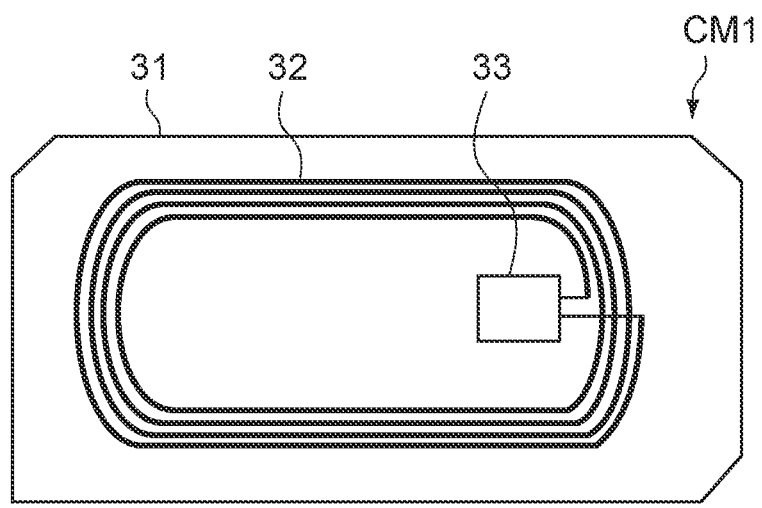
FIG. 3 is a schematic plan view showing a first cartridge memory according to an embodiment of the present technology.

FIG. 3 is a schematic plan view showing a configuration of the first cartridge memory CM1. The first cartridge memory CM1 includes an RFID tag including a support substrate 31, an antenna coil 32, and an IC chip 33.

The support substrate 31 includes a relatively rigid wiring substrate such as a glass-epoxy substrate. The antenna coil 32 is a planar loop coil formed on the support substrate 31, and is made of a copper foil, an aluminum foil, or the like, which has a predetermined thickness. The IC chip 33 is mounted on the support substrate 31 and electrically connected to the antenna coil 32. The IC chip 33 has, therein, a voltage generation unit, a memory unit, a control unit, and the like, the voltage generation unit generating an activation voltage on the basis of the signal magnetic field from the reader/writer 207 received via the antenna coil 32, the memory unit storing predetermined management information (first information) regarding the tape cartridge 100, the control unit reading information from the memory unit.

Examples of the management information include information (or data) that cannot be arbitrarily set by a user such as product information of the tape cartridge 100 and the magnetic tape 12, usage history information, and summary of information recorded on the magnetic tape 12.

Examples of the product information include manufacturing information, the number of data tracks in the magnetic tape 12, and unique information such as IDs. Examples of the manufacturing information includes a material (e.g., polyethylene terephthalate (PET)) of a base film constituting the magnetic tape 12, a coefficient of thermal expansion thereof (e.g., 15 E-6 mm/° C.), and a humidity expansion coefficient (e.g., 12 E-6 mm/RH %).

Examples of the usage history information includes access date and time, address information, communication history with the reader/writer 207, and whether or not there is an error during loading/unloading in the tape drive device 200.

As the summary of the information recorded on the magnetic tape 12, servo tracking information at the time of the initial signal recording may be included. Examples of the servo tracking information include a deviation from a reference value between certain servo bands, i.e., information regarding the difference from a reference value of the distance between servo bands read by the head mechanism (head unit 206) at the time of initial tracking. Alternatively, the servo tracking information may include position information of the servo band at the time of the initial tracking.

The first cartridge memory CM1 is configured to be capable of reading or writing information via the reader/writer 207 (first communication device). Since the first cartridge memory CM1 receives the signal magnetic field transmitted from the reader/writer 207 by the antenna coil 32 to generate electric power, the first cartridge memory CM1 operates without power supply. The power supply/communication frequency from the reader/writer 207 is 13.56 MHz, which is the same as that of NFC (Near Field Communication). A non-volatile memory (NVM) is used for the memory incorporated in the IC chip 33. The memory size is, for example, 4 kilobytes, 8 kilobytes, or 16 kilobytes, but may be 32 kilobytes, which is larger than these.

Here, the memory size of the cartridge memory of the LTO standard is increasing in proportion to the increase in the size of data recorded on the magnetic tape. As an example, the memory size has been 4 kB in LTO-1 to LTO-3, but has increased to 8 kB in LTO-4 and LTO-5 and to 16 kB in LTO-6 and LTO-7. It is expected that as the magnetic recording data size of LTOs further increases, the memory size of the cartridge memory increases to be 16 kB or more.

Meanwhile, as the memory size of the cartridge memory increases, the power consumed by the IC tends to increase. Further, also the electric power is assumed to increase associated with the increase in the memory size, e.g., the idle current of the power supply block increases due to the necessity to increase the stability of the power supply voltage to be supplied to the memory, or the digital power increases associated with processing complexity. In the standard, there is a limitation on the electric power that can be extracted from an antenna, because it is specified as a requirement that it operates at a constant magnetic field strength. For this reason, there is a demand for a technology for increasing the memory size while ensuring stable communication with a reader/writer by driving a cartridge memory with electric power that can be extracted from an antenna.

In this regard, the tape cartridge 100 according to this embodiment further includes a second cartridge memory CM2. Hereinafter, the second cartridge memory CM2 will be described.

(Second Cartridge Memory)

Figure 4:
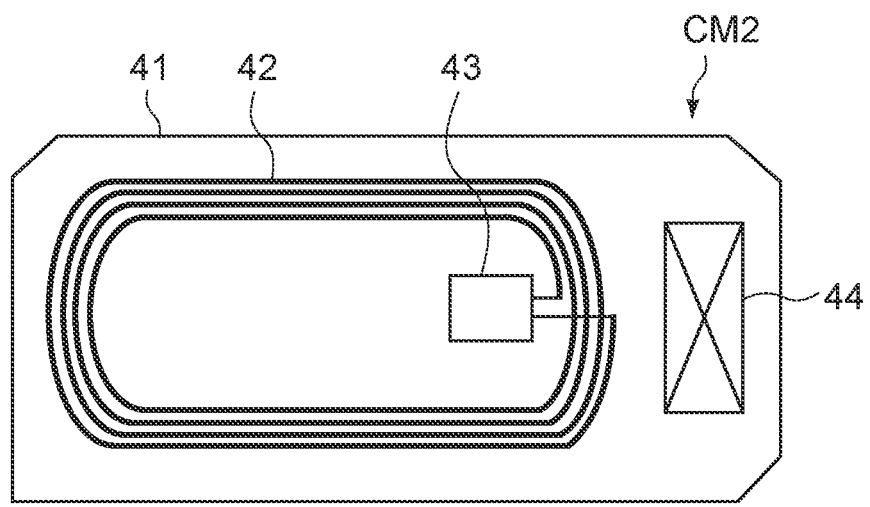
FIG. 4 is a schematic plan view showing a second cartridge memory according to an embodiment of the present technology.

FIG. 4 is a schematic plan view showing a configuration of the second cartridge memory CM2. In this embodiment, the second cartridge memory CM2 includes an RFID tag (non-contact communication medium) including a support substrate 41, an antenna coil 42, and an IC chip 43, similarly to the first cartridge memory CM1.

The support substrate 41 is configured similarly to the support substrate 31 of the first cartridge memory CM1. The support substrate 41 is formed in a shape and size similar to those of the support substrate 31. It goes without saying that the present technology is not limited thereto.

Figure 5:
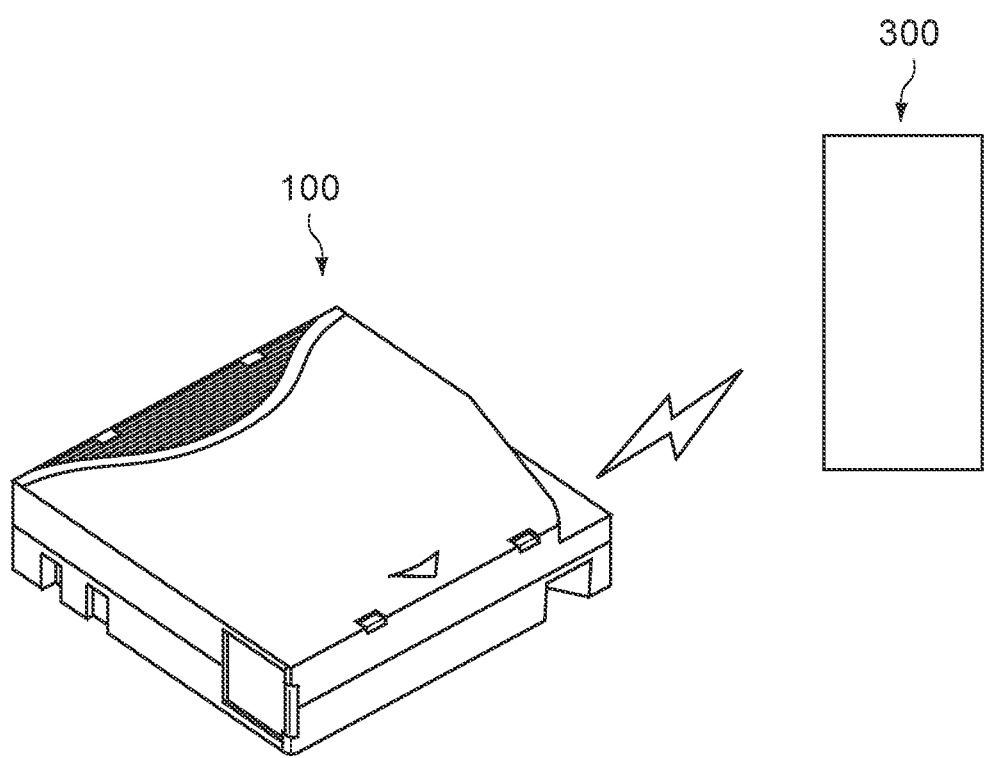
FIG. 5 is a diagram describing an action of the recording medium cartridge.

As shown in FIG. 5, the antenna coil 42 is configured to be capable of communicating with a communication device 300 (second communication device) configured by a dedicated read device or a portable information terminal such as a smartphone. The second cartridge memory CM2 is configured to be capable of reading information via the communication device 300. As a result, it is possible to read the data stored in the IC chip 43 via the communication device 300 without setting the tape cartridge 100 to the drive device 200. The communication system is not particularly limited, and may be a communication system similar to that of the first cartridge memory CM1 or another communication system. As another communication system, a communication system using several hundred MHz (megahertz) to several GHz (gigahertz) bands, such as "Wi-Fi (registered trademark)", "Zigbee (registered trademark)", "Bluetooth (registered trademark)", "Bluetooth Low Energy", "ANT (registered trademark)", "ANT+ (registered trademark)", "EnOcean (registered trademark)", can be exemplified.

The IC chip 43 has, therein, a voltage generation unit, a memory unit, a control unit, and the like, similarly to the IC chip 33 of the first cartridge memory CM1. The memory unit is configured to be capable of storing additional information (second information) relating to the tape cartridge 100.

Examples of the additional information include information (or data) that can be arbitrarily set by a user, such as indexing data of the tape cartridge 100, management ledger data, health data including usage history, an image regarding the magnetic tape 12 or the tape cartridge 100, and user information.

The second cartridge memory CM2 is not limited only to one having an area in which only the above-mentioned additional information is stored, and may have a memory area that the user cannot use freely. In this case, the memory area that the user cannot use freely may store information that is the same as the management information stored in the first cartridge memory CM1 or information accompanied thereby.

The management ledger data is, for example, data conforming to JISZ6019, which includes at least a part of information regarding the tape cartridge 100 among management ledger data registered in an archival system using the tape cartridge 100.

Examples of the image regarding the magnetic tape 12 or the tape cartridge 100 include a thumbnail image and a moving image. The image may be for promotion, an image relating to index data or health data, or an appropriate image arbitrarily selected or set by the user.

The second cartridge memory CM2 typically has a memory capacity larger than that of the first cartridge memory CM1. This allows the second cartridge memory CM2 to store information having a relatively large amount of data, such as images. Further, the second cartridge memory CM2 may also store management information stored in the first cartridge memory CM1. In this case, the second cartridge memory CM2 is capable of functioning as a backup memory for the first cartridge memory CM1, and thus, it is possible to improve the reliability of the tape cartridge 100.

The second cartridge memory CM2 is configured as a read-only memory to the communication device 300. This suppresses inadvertent or intentional rewriting of information (e.g., management ledger data) recorded on the second cartridge memory CM2, and thus, it is possible to prevent inconsistencies from occurring with the content recorded on the first cartridge memory CM1.

The second cartridge memory CM2 may further include an interface unit 44 connectable to the communication device 300 instead of or in addition to the antenna coil 42. The interface unit 44 is mounted on the support substrate 41. The interface unit 44 may include, for example, an external connection terminal including an electronic contact such as a USB (Universal Serial Bus) terminal. In this case, an opening for exposing the interface unit 44 to the outside is formed at an appropriate position of the cartridge case 11 (lower shell 11b), and a connecting cable communicating with the communication device 300 is connected through the opening.

Meanwhile, the interface unit 44 may include a communication module of a communication system different from that of the antenna coil 42. As the communication system, the short-range wireless communication technology as described above can be applied. In this case, the second cartridge memory CM2 may be configured to be capable of communicating with a drive device via the antenna coil 42 in a communication method similar to that of the first cartridge memory CM1. In this case, the drive device is configured, for example, as shown in FIG. 6.

(Drive Device)

Figure 6:
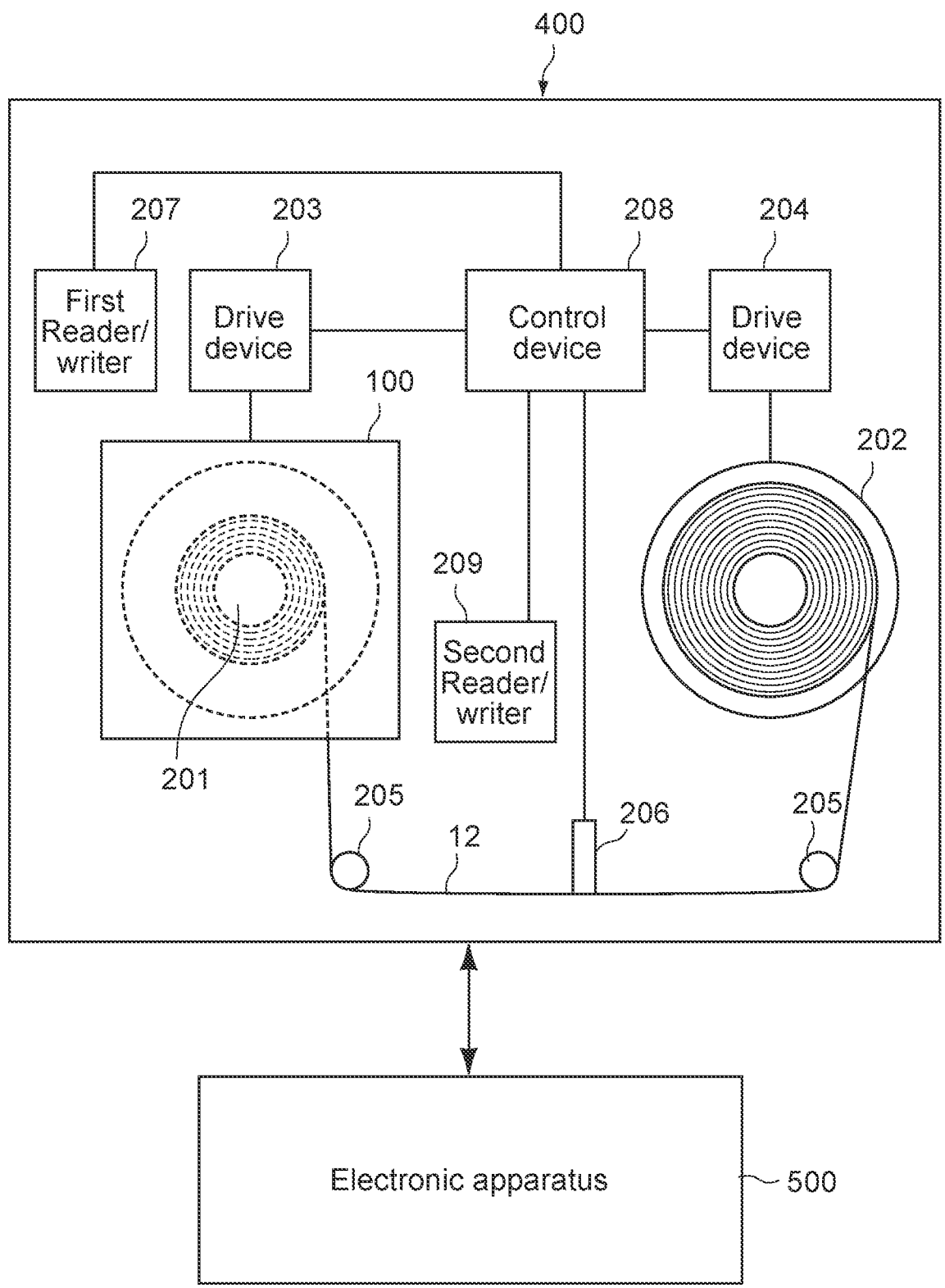
FIG. 6 is a schematic diagram showing a configuration example of a drive device according to an embodiment of the present technology.

FIG. 6 is a schematic configuration diagram of a drive device 400 including a reader/writer capable of communicating with the second cartridge memory CM2. In the figure, components corresponding to those in FIG. 2 will be denoted by the same reference symbols, and detailed description thereof will be omitted.

The drive device 400 includes a first reader/writer 207 (first communication unit) capable of communicating with the first cartridge memory CM1, and a second reader/writer 209 (second communication unit) capable of communicating with the second cartridge memory CM2. The second reader/writer 209 is disposed in the vicinity of the housing position of the second cartridge memory CM2 in the tape cartridge 100 loaded into the drive device 400. The second reader/writer 209 is configured to be capable of reading predetermined information from the second cartridge memory CM2 or recording predetermined information on the second cartridge memory CM2 in response to a command from the control device 208. As the communication system between the second reader/writer 209 and the second cartridge memory CM2, for example, an ISO14443 system is adopted.

In this embodiment, writing of information to the second cartridge memory CM2 is performed via the drive device 400. As a result, the tape cartridge 100 is centrally managed by the drive device 400.

The information to be written from the drive device 400 to the second cartridge memory CM2 is provided by an electronic apparatus 500 connected to the drive device 400. The electronic apparatus 500 may be a terminal device such as a personal computer, a video camera, or a smartphone used personally by a user, or may be a dedicated device.

Figure 7:
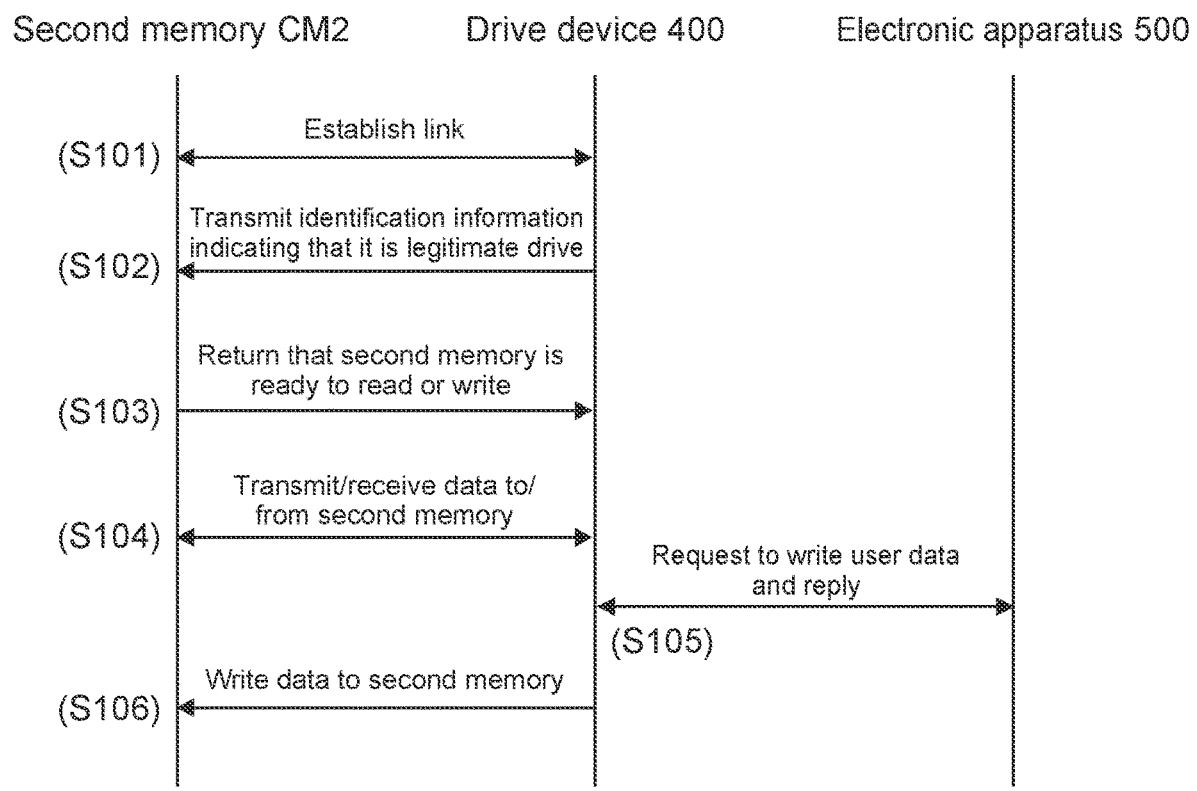
FIG. 7 is a sequence diagram describing an action of the drive device.

FIG. 7 is a sequence diagram showing an example of procedures of reading/writing data from/to the second cartridge memory CM2.

As shown in the figure, when the tape cartridge 100 is loaded into the drive device 400, communication is started between the second cartridge memory CM2 and the second reader/writer 209 (Step 101). At this time, typically, between the first cartridge memory CM1 and the first reader/writer 207, the reading or writing of the information is started independently of the second cartridge memory CM2.

When a link is established between the second cartridge memory CM2 and the second reader/writer 209, the drive device 400 transmits, to the second cartridge memory CM2, identification information indicating that the drive device is a legitimate drive device to which information is allowed to be written (Step 102). The second cartridge memory CM2 recognizes that the drive device 400 is a legitimate drive device by receiving the above-mentioned identification information, and returns, to the drive device 400, that it is ready to read or write (Step 103).

When reading information from the second cartridge memory CM2, the drive device 400 transmits a command to read information to the second cartridge memory CM2, and reads predetermined information from the second cartridge memory CM2 (Step 104). The information read from the second cartridge memory CM2 is stored in a storage unit (not shown) of the drive device 400, and displayed on a display unit (not shown) (or on a display device connected to the drive device 400) as necessary.

Meanwhile, when writing information to the second cartridge memory CM2, the drive device 400 requests the electronic apparatus 500 to transmit data to be written to the second cartridge memory CM2 (Step 105). After receiving the response from the electronic apparatus 500, the drive device 400 executes the processing of writing the data transmitted from the electronic apparatus 500 to the second cartridge memory CM2 (Step 106).

The drive device 400 may have a function of checking whether there is any contradiction or inconsistency between the information written to the first cartridge memory CM1 via the first reader/writer 207 and the information written to the second cartridge memory CM2 via the second reader/writer 209. This makes it possible to prevent discrepancies in the information stored in the first cartridge memory CM1 and the second cartridge memory CM2 from occurring, and thus, the reliability of the tape cartridge 100 is improved.

(Action of Tape Cartridge)

In accordance with the tape cartridge 100 according to this embodiment, since the first cartridge memory CM1 and the second cartridge memory CM2 are provided, it is possible to increase the total capacity of the cartridge memory while maintaining the compatibility with an existing drive device (the drive device 200 shown in FIG. 2). In addition, since there is no need to increase the memory size of the first cartridge memory CM1, stable communication between the first cartridge memory CM1 and the reader/writer 207 is ensured even under the limited magnetic field strength from the reader/writer 207.

Since the second cartridge memory CM2 is configured to be capable of reading information by the communication device 300 (second communication device) different from the drive device 200 (first communication device), it is possible to read the information relating to the tape cartridge 100 without loading the tape cartridge 100 into the drive device 200, 400.

In accordance with this embodiment, since the second cartridge memory CM2 is provided, LTFS (Linear Tape File System) can be stored in this second cartridge memory CM2. Normally, a cartridge memory stores only position information (addresses) for accessing the most recent file information stored in the magnetic tape 12 due to memory size limitations. In this regard, by storing not only the above-mentioned position information but also the file information in the second cartridge memory CM2, it is possible to increase the reading rate of the information. Such operation and effect can be realized by using the drive device 400 including the second reader/writer 209 capable of communicating with the second cartridge memory CM2.

In addition, since the addition of the second cartridge memory CM2 increases the total capacity of the memory, past additional information such as the travel history of the tape cartridge 100 and health check data can also be stored together. As a result, the detailed history of the tape cartridge 100 can be stored, and the reliability of the system can be improved.

In addition, by connecting the second cartridge memory CM2 to the wireless LAN (Local Area Network), the built-in data can be used as a NAS (Network-Attached Storage).

Although the embodiments of the present technology have been described above, it goes without saying that the present technology is not limited to the above-described embodiments and various modifications can be made.

For example, in the above-mentioned embodiments, the cartridge memory mounted on the magnetic tape cartridge of the LTO standard has been described as an example, but the present technology is not limited thereto and is applicable also to a cartridge memory for a magnetic tape cartridge of another standard other than LTO.

Further, the present technology is applicable also to an information recording medium other than the magnetic tape, e.g., optical discs, magneto-optical discs, semiconductor memories, or cartridge memories for portable hard disc drives.

Further, although the case where a recording medium cartridge includes two cartridge memories has been described as an example in the above-mentioned embodiments, the present technology is not limited thereto, and the number of cartridge memories may be three or more.

It should be noted that the present technology may take the following configurations.

(1) A recording medium cartridge, including:
an information recording medium;
a first cartridge memory that is capable of storing first information relating to the information recording medium, and includes a non-contact communication medium capable of reading/writing the first information via a first communication device disposed in a drive device; and
a second cartridge memory that is capable of storing second information relating to the information recording medium, and is configured to be capable of reading the second information via a second communication device.

(2) The recording medium cartridge according to (1) above, in which
the second cartridge memory is configured to be capable of writing the second information via the drive device.

(3) The recording medium cartridge according to (1) or (2) above, in which
the second cartridge memory has a memory capacity larger than a memory capacity of the first cartridge memory.

(4) The recording medium cartridge according to any one of (1) to (3) above, in which
the first information includes management information of the information recording medium, and the second information includes image information relating to the information recording medium.

(5) The recording medium cartridge according to any one of (1) to (4) above, in which
the second cartridge memory is a non-contact communication medium.

(6) The recording medium cartridge according to any one of (1) to (4) above, in which
the second cartridge memory includes an external connection terminal.

(7) The recording medium cartridge according to any one of (1) to (6) above, in which
the information recording medium is a magnetic recording medium.

(8) The recording medium cartridge according to (7) above, in which the information recording medium is a tape-shaped recording medium.

(9) A drive device, including:
a head unit configured to be capable of recording/reproducing data on/from an information recording medium housed in a recording medium cartridge;
a first communication unit configured to be capable of communicating with a first cartridge memory housed in the recording medium cartridge and reading or writing first information relating to the information recording medium; and
a second communication unit configured to be capable of communicating with a second cartridge memory housed in the recording medium cartridge and reading or writing second information relating to the information recording medium.

REFERENCE SIGNS LIST 11 cartridge case
12 magnetic tape
100 tape cartridge 200,400 tape drive device
207 first reader/writer
209 second reader/writer
300 communication device
500 electronic apparatus
CM1 first cartridge memory
CM2 second cartridge memory

The invention claimed is:

1. A recording medium cartridge, comprising:
an information recording medium;
a first cartridge memory that is capable of storing first information relating to the information recording medium, and includes a non-contact communication medium capable of reading/writing the first information via a first communication device disposed in a drive device; and
a second cartridge memory that is capable of storing second information relating to the information recording medium, and is configured to be capable of reading the second information via a second communication device,
wherein the first information includes management information of the information recording medium, and the second information includes image information relating to the information recording medium.

2. The recording medium cartridge according to claim 1, wherein
the second cartridge memory is configured to be capable of writing the second information via the drive device.

3. The recording medium cartridge according to claim 1, wherein
the second cartridge memory has a memory capacity larger than a memory capacity of the first cartridge memory.

4. The recording medium cartridge according to claim 1, wherein
the second cartridge memory is a non-contact communication medium.

5. The recording medium cartridge according to claim 1, wherein
the second cartridge memory includes an external connection terminal.

6. The recording medium cartridge according to claim 1, wherein
the information recording medium is a magnetic recording medium.

7. The recording medium cartridge according to claim 1, wherein
the information recording medium is a tape-shaped recording medium.

8. A drive device, comprising:
a head unit configured to be capable of recording/reproducing data on/from an information recording medium housed in a recording medium cartridge;
a first communication unit configured to be capable of communicating with a first cartridge memory housed in the recording medium cartridge and reading or writing first information relating to the information recording medium; and
a second communication unit configured to be capable of communicating with a second cartridge memory housed in the recording medium cartridge and reading or writing second information relating to the information recording medium,
wherein the first information includes management information of the information recording medium, and the second information includes image information relating to the information recording medium.

* * * * *